G. N. SAEGMULLER.
OPTICAL INSTRUMENT.
APPLICATION FILED APR. 15, 1912.
1,060,131.
Patented Apr. 29, 1913.
3 SHEETS—SHEET 1.
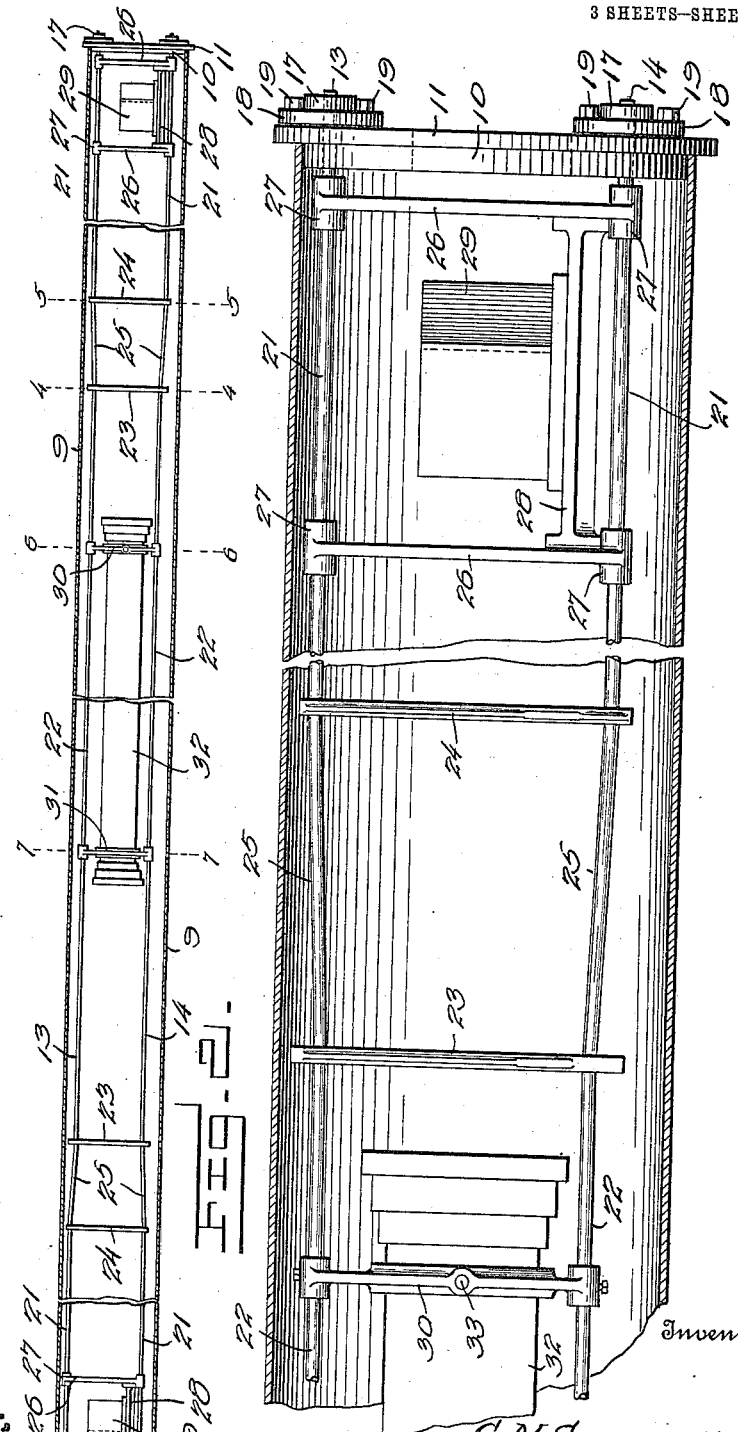

G. N. SAEGMULLER.
OPTICAL INSTRUMENT.
APPLICATION FILED APR. 15, 1912.
1,060,131.
Patented Apr. 29, 1913.
3 SHEETS—SHEET 2.
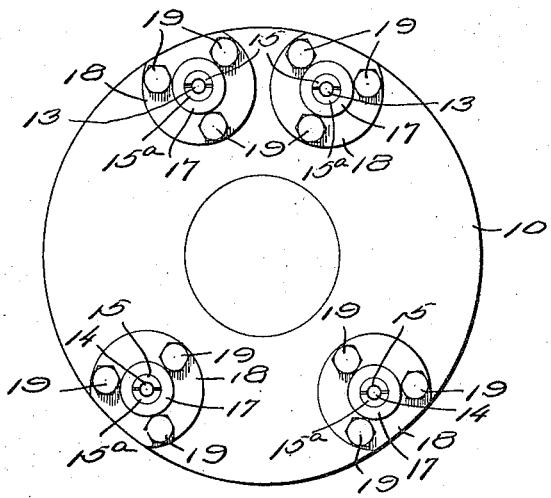
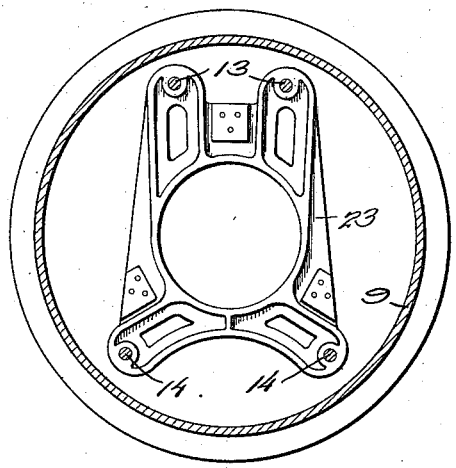
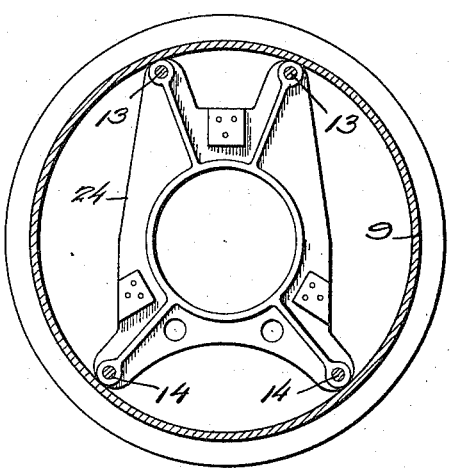
Witnesses
Inventor
G. N. Saegmuller
By 
Attorney G. N. SAEGMULLER.
OPTICAL INSTRUMENT.
APPLICATION FILED APR. 15, 1912.
1,060,131.
Patented Apr. 29, 1913.
3 SHEETS—SHEET 3.
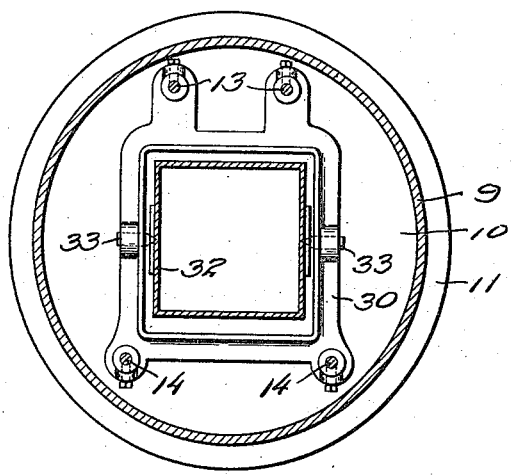
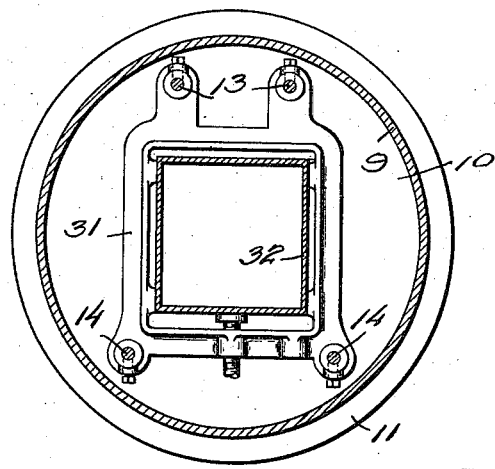
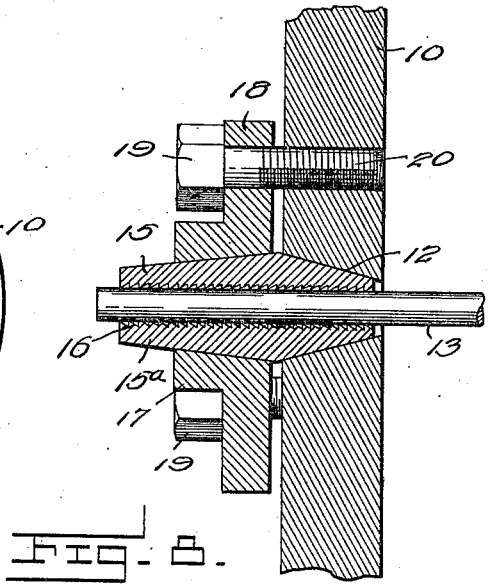
Witnesses
Inventor
G. N. Saegmuller,
By
Attorney

UNITED STATES PATENT OFFICE.

GEORGE N. SAEGMULLER, OF ROCHESTER, NEW YORK, ASSIGNOR TO BAUSCH & LOMB OPTICAL COMPANY, OF ROCHESTER, NEW YORK, A CORPORATION OF NEW YORK.

OPTICAL INSTRUMENT.

1,060,131. Specification of Letters Patent. Patented Apr. 29, 1913.

Application filed April 15, 1912. Serial No. 690,785.

*To all whom it may concern:*

Be it known that I, GEORGE N. SAEGMULLER, a citizen of the United States, residing at Rochester, in the county of Monroe and State of New York, have invented new and useful Improvements in Optical Instruments, of which the following is a specification.

The present invention relates to optical instruments of that type in which an elongated or extended support or base is employed, and is in the nature of an improvement on the structures disclosed in a former patent granted to me on July 5, 1910, No. 963,473.

The object is to provide a support of the same general type, but which is even more effective in service and entirely practical in its construction.

The preferred embodiment of this invention is illustrated in the accompanying drawings, wherein:—

Figure 1 is a vertical longitudinal sectional view through the instrument, with portions thereof broken away. Fig. 2 is a corresponding view on an enlarged scale, of one end portion of the same. Fig. 3 is an end elevation. Figs. 4, 5, 6 and 7 are cross sectional views taken respectively on the lines 4—4, 5—5, 6—6 and 7—7 of Fig. 1. Fig. 8 is a detail longitudinal sectional view of one of the tension rod clamps.

Similar reference numerals designate corresponding parts in all the figures of the drawings.

In the embodiment disclosed, the usual tubular base 9 is employed, which is provided with end closures 10. These end closures fit within the ends of the tube, and have outstanding flanges 11 that bear against the end edges thereof. They are provided in the present construction with four inwardly tapered sockets 12 that extend entirely through said closures, as will be apparent by reference to Fig. 8.

Disposed longitudinally within the tube, are tension rods, an upper set being designated 13, and a lower set being illustrated at 14. The end portions of these rods pass through the sockets 12, and are surrounded by gripping or holding devices, in the form of sections 15 and 15ª that have teeth 16 on their inner sides, which teeth bite into the rods, as will be evident. The said gripping sections are surrounded by clamping collars 17, provided with outstanding flanges 18, through which are passed headed bolts 19 that are threaded, as shown at 20, into the end closures 10. It will be evident that by screwing the bolts 19 inwardly, the collars 17 will be caused to ride upon the outer tapered portions of the grips, thus bringing them into holding relation with respect to the rods.

By reference to Fig. 1, it will be noted that the end portions 21 of the rods, within the tube, are disposed farther apart than the intermediate portions 22, but it will be also noted that the corresponding portions 21 and the corresponding portions 22 are disposed in parallel relation. This disposition of the rods is secured by means of independent spacing plates 23 and 24, having opening in their corners, through which the wires pass. The openings of the plate 23 are disposed nearer together than the openings 24, and thus cause offsets 25 in said rods between the plates 23 and 24. The function of these plates in thus producing the offsets is to prevent vibration of the rods.

Supported on the end portions 21 of the tension rods are mounting plates 26 that are provided in their corners with eyes 27, through which said rods pass. These mounting plates are spaced apart, and are connected by a suitable shelf or support 28, on which the usual optical elements, preferably in the form of prisms 29, are supported. The central parallel portions 22 of the rods are also provided with mounting plates 30 and 31, which carry the usual optical elements, in this instance, mounted in a tube 32. One end of this tube is preferably pivoted, as illustrated at 33, to the mounting plate 30, while the other end has a sliding adjustment in the other plate 31. The means for effecting the adjustments and the various measuring and indicating mechanisms are not shown, in order to avoid confusion, and inasmuch as they are readily understood to those skilled in the art.

It will be evident that this structure is exceedingly simple, and experience has fully demonstrated that it is highly efficient and overcomes many of the defects in an instrument of this character, which is of necessity of considerable length, and at the same time, has been heretofore more or less subject to changes in temperature and the like.

In actual practice, the tension rods or wires are placed under very high tension. For example in a three meter base, the tension is about five thousand pounds; in the twenty-two foot instrument, the tension members have been stretched up to ninety-five hundred pounds. Of course the diameter of the wires in the various instruments varies according to the size.

From the foregoing, it is thought that the construction, operation and many advantages of the herein described invention will be apparent to those skilled in the art, without further description, and it will be understood that various changes in the size, shape, proportion and minor details of construction, may be resorted to without departing from the spirit or sacrificing any of the advantages of the invention.

Having thus fully described my invention, what I claim as new, and desire to secure by Letters Patent, is:—

1. In a structure of the character set forth, the combination with a base, of optical elements, and means for mounting the elements on the base, including at least three tension members spaced apart and extending longitudinally of the base, said members being placed under heavy tension and being secured at their ends to the base.

2. In a structure of the character set forth, the combination with a tubular base, of optical elements located therein, and means for mounting the elements on the base, including at least three tension rods spaced apart and extending longitudinally within the base, said rods being placed under tension and being secured at their ends to the end portions of the tubular base.

3. In a structure of the character set forth, the combination with a base, of optical elements, and means for mounting the same on the base, comprising spaced members placed under tension and located above and below said elements.

4. In a structure of the character set forth, the combination with a base, of optical elements, and means for mounting the same on the base, comprising spaced sets of elements placed under longitudinal tension and located respectively above and below said elements.

5. In a structure of the character set forth, the combination with a tubular base, of optical elements arranged therein, and means for mounting the elements on the base, comprising spaced rods placed under longitudinal tension and located above and below the said elements.

6. In a structure of the character set forth, the combination with a tubular base, of spaced lower tension rods arranged longitudinally thereof, spaced upper tension rods located longitudinally thereof, and optical elements mounted on the rods and located between the same.

7. In a structure of the character set forth, the combination with a tubular base, of spaced lower rods extending longitudinally therethrough and secured at their ends, spaced upper rods arranged longitudinally within the base and secured at their ends, said rods being placed under tension, independent mountings carried at intervals by the rods, and optical elements supported on said mountings.

8. In a structure of the character set forth, the combination with a base, of tension members mounted thereon, optical elements mounted on the tension members at spaced points, and spacing devices interposed between the tension members and located between the said optical elements.

9. In a structure of the character set forth, the combination with a base, of tension rods mounted thereon, optical elements mounted on the rods at spaced points, and spacing devices interposed between the tension rods and causing offsets therein, said devices being located between the said optical elements.

10. In a structure of the character set forth, the combination with a base, of tension rods mounted thereon, optical elements mounted on the rods at spaced points, and means engaging the rods between the elements for offsetting said rods.

11. In a structure of the character set forth, the combination with a base, of tension rods mounted thereon, optical elements mounted on the rods at spaced points, and spacing plates mounted on the tension rods between the optical elements.

12. In a structure of the character set forth, the combination with a base, of longitudinally disposed members mounted thereon at their ends and placed under longitudinal tension, said members having corresponding portions at different distances from their ends, located different distances apart, said corresponding portions being substantially parallel, and optical elements mounted on said corresponding portions.

13. In a structure of the character set forth, the combination with a base, of tension rods mounted thereon at their ends and having corresponding portions at different distances from their ends located different distances apart, said corresponding portions being substantially parallel, devices engaging the rods between the said corresponding portions for offsetting said rods, and optical elements mounted on said corresponding portions.

14. In a structure of the character set forth, the combination with a tubular base, of upper and lower sets of rods disposed longitudinally therein, said rods being under tension, spaced spacing plates arranged upon the rods at predetermined points, and causing offsets therein, the remaining corresponding portions of the rods being substantially parallel, and optical elements mounted on the said substantially parallel portions of the rods.

15. In a structure of the character set forth, the combination with a base, of at least three tension rods mounted thereon, mountings supported by all the rods, and optical elements carried on said mountings.

16. In a structure of the character set forth, the combination with a base, of at least three tension rods mounted thereon, spaced mountings each supported by all the rods, and an optical element located between the mountings and the rods and carried by the former.

17. In a structure of the character set forth, the combination with a tubular base, of at least three tension rods disposed longitudinally therein, independent mountings each engaged with all of the rods, and optical elements located between the mountings and between the rods and carried by said mountings.

18. In a structure of the character set forth, the combination with a tubular base, of upper and lower sets of tension rods extending longitudinally therein, spacing plates arranged on intermediate portions of the rods and causing offsets therein, the remaining portions of said rods being substantially parallel, spaced mountings carried by the end portions of the rods, optical elements carried by said mountings, other spaced mountings secured to the rods between the spacing plates, and an optical member carried by the latter mountings.

19. In a structure of the character set forth, the combination with a base, of a plurality of tension members, mountings carried by the tension members, and an optical tube adjustably mounted on said mountings.

20. In a structure of the character set forth, the combination with a base, of a plurality of tension members mounted thereon, spaced mountings carried by the tension members, and an optical tube pivotally mounted on one of the mountings and having an adjustable engagement with the other mounting.

21. In a structure of the character set forth, the combination with a tubular support, of four longitudinally disposed tension rods extending therethrough and mounted at their ends on the support, sets of spaced spacing plates arranged on intermediate portions of the rods and causing offsets therein, the remaining portions of said rods being substantially parallel, spaced mountings arranged on both end portions of the rods, prisms carried by said mountings, other spaced mountings carried by the rods between the sets of spacing plates, and an optical tube carried by the latter mountings.

22. In a structure of the character set forth, the combination with a tubular base, of an end closure therefor, a tension member extending longitudinally of the base and passing through the closure, a tension member-engaging grip bearing against the closure, means for tightening the grip upon the member, and an optical element supported by the tension member.

23. In a structure of the character set forth, the combination with a tubular base, of an end closure therefor, a tension member extending longitudinally of the base and passing through the closure, a tension member engaging grip comprising sections embracing the member, said sections bearing against the closure, means for tightening the grip sections upon the tension member, and an optical element supported by the tension member.

24. In a structure of the character set forth, the combination with a tubular base, of an end plate closing the same, and provided with a plurality of tapered sockets therein, tension rods extending longitudinally of the base and passing through the sockets, optical elements carried by the rods, oppositely tapered grip sections engaging in the sockets and embracing the rods, and clamping plates adjustably mounted on the end closure and surrounding the grips.

In testimony whereof I have hereunto set my hand in presence of two subscribing witnesses.

GEORGE N. SAEGMULLER.

Witnesses:
WILLIAM G. WOODWORTH,
HENRY C. THON.